United States Patent
Jalonen et al.

(10) Patent No.: US 6,547,848 B1
(45) Date of Patent: Apr. 15, 2003

(54) METHOD FOR COOLING THE GAS FLOW IN A SMELTING FURNACE

(75) Inventors: Antti Jalonen, Pori (FI); Risto Saarinen, Espoo (FI)

(73) Assignee: Outokumpu Oyj, Espoo (FI)

(*) Notice: Subject to any disclaimer, the term of this patent is extended or adjusted under 35 U.S.C. 154(b) by 0 days.

(21) Appl. No.: 09/979,452

(22) PCT Filed: May 12, 2000

(86) PCT No.: PCT/FI00/00432

§ 371 (c)(1),
(2), (4) Date: Nov. 13, 2001

(87) PCT Pub. No.: WO00/73724

PCT Pub. Date: Dec. 7, 2000

(30) Foreign Application Priority Data

May 26, 1999 (FI) .................................................. 991192

(51) Int. Cl.$^7$ ................................................ C22B 9/00
(52) U.S. Cl. .......................................... 75/414; 266/147
(58) Field of Search .............................. 75/414; 266/147

(56) References Cited

U.S. PATENT DOCUMENTS

| 3,988,421 A | * | 10/1976 | Rinaldi ........................ 423/210 |
| 4,183,506 A | * | 1/1980 | Teshima et al. ................ 266/88 |
| 4,235,425 A | * | 11/1980 | Beggs et al. .................. 266/147 |
| 4,436,286 A | | 3/1984 | Schnabel et al. ............... 266/44 |
| 4,469,493 A | * | 9/1984 | Tuovinen et al. ............... 55/89 |
| 4,568,065 A | * | 2/1986 | Talonen ....................... 266/157 |
| 4,909,160 A | * | 3/1990 | Frick et al. .................. 110/185 |
| 5,453,115 A | * | 9/1995 | Vuletic ........................ 95/186 |

OTHER PUBLICATIONS

Schwartz, Harold. Properties of Lead, ProKon Version 8.6 1998.*

* cited by examiner

Primary Examiner—Roy King
Assistant Examiner—Andrew Wessman
(74) Attorney, Agent, or Firm—Smith-Hill and Bedell

(57) ABSTRACT

The present invention relates to a method for cooling the gas flow exiting through the uptake of a smelting furnace such as a flash-smelting furnace with finely dispersed liquid sprays, which prevents the solid matter particles contained within from coalescing and sintering.

21 Claims, 1 Drawing Sheet

METHOD FOR COOLING THE GAS FLOW IN A SMELTING FURNACE

The present invention relates to a method for cooling the gas flow exiting through the uptake in a smelting furnace such as a flash-smelting furnace with finely dispersed liquid sprays, which prevent the solid matter particles contained within from coalescing and sintering.

As is well known, a flash-smelting furnace consists of a reaction shaft, lower furnace and uptake. The concentrate to be smelted and admixtures are fed into the reaction shaft, where they melt and settle to the lower furnace, forming at least matte and slag layers from the concentrate and flux. The exhaust gases which formed and reacted during the handling, are removed in the uptake, where also the finest part of the melt droplets tend to remove as flue dust along with the gases. Gases are usually cooled and scrubbed in a waste heat boiler and electrostatic precipitator placed after the uptake. The purpose of the radiation section of the waste heat boiler is to cool the gases, so that the melt particles solidify and the temperature drops to below the sintering temperature of the particles. The gases exiting the smelting furnace can also be treated in a different way.

The temperature of the gases leaving via the uptake of a flash-smelting furnace is of the order of 1300° C., depending to a certain extent on the material being smelted. Often, the melt droplets that flow together with the exhaust gases tend to sinter together and attach to the walls, and for instance to the outlet leading from the uptake to the after-treatment equipment, the so-called neck of the uptake. The removal of build-ups from the neck is only possible by chiselling or shooting, which cause disruption in production.

In certain cases, e.g. the flash-smelting process for nickel, the flue particles flowing with the exhaust gases are oxidic, usually Fe or Ni. In this case, the melting point of the flue dust generated in the flash-smelting furnace can rise to such a high point, that it is not feasible to keep the flue particles molten outside the,uptake, although the temperature of said uptake can be raised to some extent by burning additional fuel there. This results in build-ups caused by the dust particles particularly at the gas outlet point.

A method has now been developed to overcome the previously described disadvantage, namely removing of the build-ups formed by dust particles and the method reduces formation of said build-ups and alters the nature of the build-up. According to the method developed, the temperature of the exhaust gas flow and dust particles contained therein coming from the smelting furnace is lowered at the uptake stage by a finely dispersed liquid sprays, so that the particles neither sinter not attach themselves to surfaces but instead, they travel together with the gas flow out of the furnace. The dust, which settles in the neck, is so brittle and fine grained, that it can be easily blown from the outlet without interrupting the process. The essential features of this invention will become apparent in the attached patent claims.

In practice, the cooling of dust occurs by spraying very fine water droplets into the uptake, for example, via radial nozzles from the walls of the uptake to inside the furnace. The amount of water to be sprayed should be small enough that it evaporates entirely, so that not even a single water drop could cause any risk of explosion on the surface of the melt. It has been proved, that a sufficient temperature drop in the dust particles can be achieved when the amount of water to be, sprayed is 40–120 kg/1000 Nm$^3$ of the gas flow in the uptake shaft.

DETAILED DESCRIPTION

Figure 1:
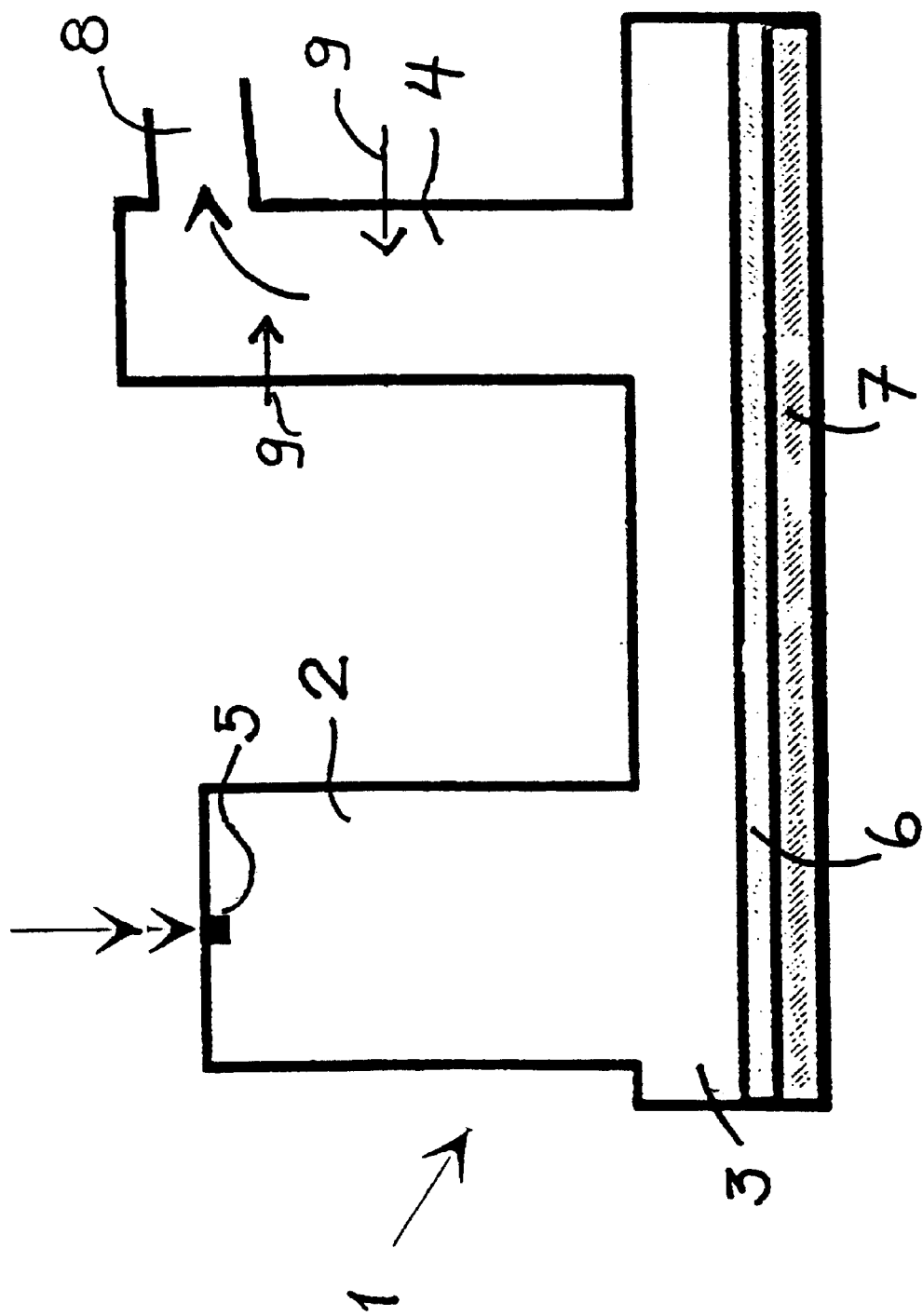
FIG. 1 is a schematic diagram of a flash-melting furnace.

FIG. 1 presents a flash-smelting furnace 1, consisting of a reaction shaft 2, a lower furnace 3 and an uptake 4. The concentrate, flux, flue dust and reaction gas are fed into the furnace via a concentrate burner 5 above the reaction shaft. The solid material fed into the reaction shaft melts and reacts both with the oxygen-bearing reaction gas and each other. At least two melt layers are formed in the lower furnace, a slag layer 6 on top and a matte layer 7 underneath. The exhaust gases generated in the reaction leave the furnace via the uptake to a neck of the uptake 8, and the finest melt particles flow with the gas. The uptake is furnished with spray nozzles 9, through which water is sprayed on to the hot gases. This lowers the temperature of the melt particles to clearly below their melting point, and preferably to below their sintering temperature. In this way, the gases are cooled to within a temperature range of 1000–1150° C. It is advantageous to place at least some of the spray nozzles in the proximity of the uptake neck, and said spray nozzles can be arranged in one or several layers. The result of the jet spraying is that some of the solid matter particles drop back in to the melt in the lower furnace and some continue their journey as brittle particles to an after-treatment unit of the gases.

What is claimed is:

1. A method to prevent dust particles flowing with an exhaust gas flow of a smelting furnace from sintering at the exhaust gas outlet of the smelting furnace and in after-treatment equipment, comprising cooling the exhaust gas flow to an extent such that the dust particles are cooled to a temperature below the melting point of the dust particles before the gas exits from the furnace.

2. A method according to claim 1, comprising cooling the exhaust gas flow with finely dispersed water sprays.

3. A method according to claim 1, comprising cooling the exhaust gas flow with finely dispersed water sprays located near the exhaust gas outlet.

4. A method according to claim 1, comprising cooling the exhaust gas flow to a temperature in the range from 1000–1150° C.

5. A method according to claim 1, wherein the furnace is a flash-smelting furnace.

6. A method according to claim 5, wherein the flash-smelting furnace has an uptake and the method comprises cooling the exhaust gas flow in the uptake.

7. A method according to claim 1, wherein the furnace has an uptake and the method comprises cooling the exhaust gas flow by spraying with water at a rate of 40–120 kg per 1000 Nm$^3$ gas flow in the uptake.

8. A method to prevent dust particles flowing with an exhaust gas flow of a smelting furnace from sintering at the exhaust gas outlet of the smelting furnace and in after-treatment equipment, comprising cooling the exhaust gas flow to an extent such that the dust particles are cooled to a temperature below the sintering point of the dust particles before the gas exits from the furnace.

9. A method according to claim 8, comprising cooling the exhaust gas flow with finely dispersed water sprays.

10. A method according to claim 8, comprising cooling the exhaust gas flow with finely dispersed water sprays located near the exhaust gas outlet.

11. A method according to claim 8, comprising cooling the exhaust gas flow to a temperature in the range from 1000–1150° C.

12. A method according to claim 8, wherein the furnace is a flash-smelting furnace.

13. A method according to claim 12, wherein the flash-smelting furnace has an uptake and the method comprises cooling the exhaust gas flow in the uptake.

14. A method according to claim 8, wherein the furnace has an uptake and the method comprises cooling the exhaust gas flow by spraying with water at a rate of 40–120 kg per 1000 Nm³ gas flow in the uptake.

15. A method of operating a smelting furnace having an uptake leading to an exhaust gas outlet, said method comprising cooling an exhaust gas flow of the furnace in the uptake to prevent sintering of dust particles in the exhaust gas.

16. A method according to claim 15, comprising cooling the exhaust gas flow with finely dispersed water sprays.

17. A method according to claim 15, comprising cooling the exhaust gas flow with finely dispersed water sprays located near the exhaust gas outlet.

18. A method according to claim 15, comprising cooling the exhaust gas flow to an extent such that the dust particles are cooled to a temperature below their melting point.

19. A method according to claim 15, comprising cooling the exhaust gas flow to an extent such that the dust particles are cooled to a temperature below their sintering point.

20. A method according to claim 15, comprising cooling the exhaust gas flow to an extent such that the dust particles are cooled to a temperature in the range from 1000–1150° C.

21. A method according to claim 15, wherein the furnace is a flash-smelting furnace.

* * * * *